US009650294B2

(12) United States Patent
Yamashita et al.

(10) Patent No.: US 9,650,294 B2
(45) Date of Patent: May 16, 2017

(54) BURNED CEMENT CLINKER AND METHOD FOR PRODUCING THE SAME

(75) Inventors: Makio Yamashita, Chichibu-gun (JP); Yoichiro Nakanishi, Chichibu-gun (JP); Hisanobu Tanaka, Chichibu-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 161 days.

(21) Appl. No.: 13/582,761

(22) PCT Filed: Mar. 11, 2011

(86) PCT No.: PCT/JP2011/055732
§ 371 (c)(1),
(2), (4) Date: Sep. 5, 2012

(87) PCT Pub. No.: WO2011/111811
PCT Pub. Date: Sep. 15, 2011

(65) Prior Publication Data
US 2013/0000524 A1    Jan. 3, 2013

(30) Foreign Application Priority Data
Mar. 12, 2010    (JP) ................................. 2010-056745

(51) Int. Cl.
*C04B 7/00* (2006.01)
*C04B 7/02* (2006.01)
*C04B 7/42* (2006.01)

(52) U.S. Cl.
CPC .................. *C04B 7/00* (2013.01); *C04B 7/02* (2013.01); *C04B 7/421* (2013.01)

(58) Field of Classification Search
CPC ..... C04B 22/062; C04B 22/149; C04B 28/08; C04B 28/36; C04B 7/00; C04B 7/14; C04B 7/24; C04B 7/3456; C04B 9/02; C04B 9/04; C04B 9/06; C04B 28/065; C04B 35/265; C04B 35/2608
USPC ........................................................ 106/733
See application file for complete search history.

(56) References Cited

U.S. PATENT DOCUMENTS

| 4,042,408 | A |   | 8/1977  | Murray et al. |
| 4,135,941 | A |   | 1/1979  | Skalny et al. |
| 4,224,077 | A |   | 9/1980  | Olifer et al. |
| 2007/0144404 | A1 | * | 6/2007  | Sorrentino ................ C04B 5/06 106/692 |
| 2008/0092781 | A1 | * | 4/2008  | Ramirez Tobias et al. .. 106/767 |

FOREIGN PATENT DOCUMENTS

| CN | 86104282 A | * | 12/1987 |
| GB | 2055786 A |   | 3/1981 |
| JP | S4812324 A |   | 2/1973 |
| JP | S54-99125 A |   | 8/1979 |
| JP | S55-3380 A |   | 1/1980 |
| JP | 09-295841 A |   | 11/1997 |
| JP | 2008-506628 A |   | 3/2008 |
| JP | 2009-161412 A |   | 7/2009 |
| JP | 2009-179512 A |   | 8/2009 |
| JP | 2009-190904 A |   | 8/2009 |
| JP | WO-2008/050484 A1 |   | 2/2010 |
| JP | 2011184253 A |   | 9/2011 |
| WO | WO-2008/050484 A1 |   | 5/2008 |

OTHER PUBLICATIONS

Ismail, Khairul Nizar; Hussin, Kamarudin; Idris, Mohd Sobri. "Physical, Chemical, and Mineralogical Properties of Fly Ash". Journal of Nuclear and Related Technology. vol. 4. pp. 47-51. 2007.*
"Concrete". Verein Deutscher Zementwerke e.V. 1996. http://www.wbcsdcement.org/pdf/tf2/betonen.pdf.*
Notification (Information Statement) mailed Nov. 27, 2013, issued for Japanese patent application No. 2011-052431.
International Search Report dated Apr. 5, 2011, issued for PCT/JP2011/055732.
Japan Cement Association, "Cement Science and Concrete Technology, No. 54/2000", Issued on Feb. 10, 2001, pp. 123 to 128 and partial translation thereof.
Japan Cement Association, "Introduction to Cement & Concrete", Issued in Dec. 2009, pp. 19 to 20, p. 71 and partial translation thereof.
Japan Society of Civil Engineers, "Concrete Library 111 Present Conditions and Problems Relating to Elution of Minor Components from Concrete", Issued on May 30, 2003, pp. 25 to 26 and partial translation thereof.
Makio Yamashita et al., "The influence of bromide ion on the properties of cement" Ube-Mitsubishi Cement Research Institute Corporation, "Research Report of Ube-Mitsubishi Cement No. 7, 2006", Issued on Jan. 4, 2006, pp. 10 to 16, cover pages and English abstract and partial translation thereof.
G K Moir, Mineralisers, Modifiers and Activators in the Clinkering Process, 9th International Congress on the Chemistry of Cement New Delhi India, Congress Reports, vol. I, 1992, pp. 125-152 and cover pages.
Notice of Reasons for Rejection issued in corresponding Japanese Patent Application No. JP 2011-052431, dated May 7, 2014.
K. Shimosaka et al. "Influence of Minor Elements in Clinker on the Properties of Clinker and Cement," 34th Paper Award of Japan Cement Association, Cement & Concrete, Feb. 2007, pp. 57-64, No. 720.
Notification of Information Statement issued in corresponding Japanese Patent Application No. JP 2011-052431, dated Jul. 30, 2014.
Report of the Technical Committee on Cement Chemistry (C-7) "Study on Chemical Analysis Method for Trace Elements in Cement Using X-ray Fluorescence Spectrometric Analysis," Japan Cement Association, Jan. 30, 2014.
Javed I. Bhatty et al. Text Book: "Innovation in Portland Cement Manufacturing", 2004, 17 sheets in total.
Friedrich W. Locher, Text Book: "Cement: Principle of production and use", 2005, 3 sheets in total.
Opposition dated Jan. 16, 2015, issued for the Thai patent application No. 1201004626 and English translation thereof.
* cited by examiner

*Primary Examiner* — Jun Li
*Assistant Examiner* — Karam Hijji
(74) *Attorney, Agent, or Firm* — Locke Lord LLP

(57) ABSTRACT

This burned cement clinker is a burned cement clinker including at least one selected from the group consisting of fluorine, sulfur, chlorine and bromine, and at least one metallic element(s) selected from the group consisting of elements in groups 3 through 12 of the periodic table. Preferably, the amount of fluorine is within a range from 300 to 750 mg/kg, the amount of sulfur (expressed in terms of $SO_3$) is within a range from 1.5 to 3.0% by mass, the amount of at least one chlorine equivalent(s) selected from the group consisting of chlorine and bromine is within a range from 150 to 350 mg/kg, and the amount of at least one metallic element selected from the group consisting of elements in groups 3 through 12 of the periodic table is within a range from 0.2 to 0.8% by mass.

3 Claims, No Drawings

US 9,650,294 B2

BURNED CEMENT CLINKER AND METHOD FOR PRODUCING THE SAME

TECHNICAL FIELD

The present invention is related to a burned cement clinker which may be burned at lower temperature than in the past; and a method for producing the same. More particularly, the present invention is related to a burned cement clinker which permits a reduced burning temperature with the addition of fluorine, chlorine and sulfur, as well as a certain metal component, and a method for producing the same.

Priority is claimed on Japanese Patent Application No. 2010-056745 filed on Mar. 12, 2010, the content of which is incorporated herein by reference.

BACKGROUND ART

During the process for producing cement, there is a need for an enormous amount of heat energy to burn a cement clinker at high temperature. Forming a principal mineral alite contained in the cement clinker requires a high temperature burning process which uses enormous amounts of energy. Addition of mineralizers such as fluorides has been known in the past in order to lower the temperature of formation of alite and accelerate its reaction.

For instance, Patent Document 1 (Japanese Unexamined Patent Application, First Publication No. 2009-161412) discloses a cement composition, produced by adding a chlorine-containing compound and gypsum into a ground cement clinker which is made from chlorine-containing wastes and further contains each given amount of fluorine, sulfur and chlorine.

Patent Document 2 (Japanese Unexamined Patent Application, First Publication No. 2009-179512) discloses a cement composition, wherein the cement composition includes a cement clinker ground product containing each given amount of fluorine, sulfur and chlorine, and gypsum, an expansive material and the like Patent Document 3 (Japanese Unexamined Patent Application, First Publication No. 2009-190904) discloses a soil stabilizer containing gypsum and a cement clinker ground product containing each given amount of fluorine, sulfur and chlorine.

It has been traditionally considered the advantage for the conventionally-known cement composition or the soil stabilizer to use the cement clinker which may be burned at low temperature. However, the burned cement clinker disclosed in Examples in Patent Document 1 includes about 1,500 to about 2,200 mg/kg of fluorine to lower the burning temperature to between 1,270 and 1,300° C. The burned cement clinkers disclosed in the Examples in Patent Documents 2 and 3 contain about 1,000 mg/kg of fluorine to burn them at the burning temperature of 1,370° C. Thus, any of the conventional burned cement clinkers which might be burned at low temperature would contain a large amount of fluorine.

However, fluorine contained in the cement clinker could be factors of deterioration in the quality, including markedly retard setting of the cement, and therefore, it deems undesirable to increase the amount of fluorine.

CITATION LIST

Patent Document

Patent Document 1:
Japanese Unexamined Patent Application, First Publication No. 2009-161412
Patent Document 2:
Japanese Unexamined Patent Application, First Publication No. 2009-179512
Patent Document 3:
Japanese Unexamined Patent Application, First Publication No. 2009-190904

DISCLOSURE OF INVENTION

Technical Problem

The mineralizer containing fluorine, chlorine and sulfur has been used conventionally in order to lower the burning temperature. The burned cement clinker of the present invention is directed to permit a markedly reduced burning temperature of the cement clinker without further increasing the amounts of fluorine and chlorine to accomplish the economical production of the cement clinker by adding as the mineralizer component(s) fluorine, chlorine and sulfur, as well as one or more of metallic element(s) selected from the group consisting of elements in groups 3 through 12 of the periodic table. Moreover, cement made by using the burned cement clinker of the present invention may operate similarly to the traditional ordinary portland cement. Also, the cement made by using the burned cement clinker of the present invention may also comply with current Japanese Industrial Standards (JIS R 5210), official information, technical specification required by academic societies and the like.

Solution to Problem

The present invention is directed to a burned cement clinker which has solved the problems abovementioned through the following constitutions and a method for producing the same.

[1] A burned cement clinker, including at least one selected from the group consisting of fluorine, sulfur, chlorine and bromine, and at least one metallic element(s) selected from the group consisting of elements in groups 3 through 12 of the periodic table.

[2] The burned cement clinker according to [1], wherein in the burned cement clinker, the amount of fluorine is within a range from 300 to 750 mg/kg, the amount of sulfur (expressed in terms of $SO_3$) is within a range from 1.5 to 3.0% by mass, the amount of at least one chlorine equivalent selected from the group consisting of chlorine and bromine is within a range from 150 to 350 mg/kg, and the amount of at least one of metallic element(s) selected from the group consisting of elements in groups 3 through 12 of the periodic table is within a range from 0.2 to 0.8% by mass.

[3] The burned cement clinker according to [2], wherein the content of the chlorine equivalent(s) corresponds to a total of the content of chlorine and the content of bromine expressed in terms of chlorine.

[4] The burned cement clinker according to [2] or [3], wherein the metallic element(s) are at least one of metallic element(s) selected from the group consisting of vanadium, cobalt, nickel, copper and zinc, and the amount of the metallic element(s) corresponds to the sum of the amount of zinc and the amounts of the respective metallic elements expressed in terms of zinc.

[5] A method for producing a burned cement clinker comprises: a step of adding, to a cement clinker raw material, a mineralizer which includes a component containing at least one selected from the group consisting of a fluorine component, a sulfur component, chlorine and bromine, and a component containing at least one metallic element selected from the group consisting of elements in groups 3 through 12 of the periodic table, and then burning them; or a step of adding the respective components to each cement clinker raw material, and then burning them.

[6] The method for producing a burned cement clinker according to [5], wherein, a mineralizer is added to a cement clinker raw material, and burning them, and the mineralizer includes a component containing any one or more elected from the group consisting of a fluorine component, a sulfur component, chlorine and bromine, and a component containing metallic element(s) so that in the resulting burned cement clinker, the amount of fluorine is within a range from 300 to 750 mg/kg, the amount of sulfur (expressed in terms of $SO_3$) is within a range from 1.5 to 3.0% by mass, the amount of at least one chlorine equivalent(s) selected from the group consisting of chlorine and bromine is within a range from 150 to 350 mg/kg and the amount of at least one metallic element(s) selected from the group consisting of elements in groups 3 through 12 of the periodic table is within a range from 0.2 to 0.8% by mass.

Advantageous Effects of Invention

According to the present invention, the burned cement clinker includes at least any one selected from the group consisting of fluorine, sulfur, chlorine and bromine and any one or more metallic element(s) selected from the group consisting of elements in groups 3 through 12 of the periodic table to permit the burning temperature of the cement clinker to be lowered without increasing the amount of fluorine. In particular, the cement clinker may be burned at a temperature of 1,300° C. or lower even if the amount of fluorine therein is from 300 to 750 mg/kg.

For instance, as shown in Example 1, the burned cement clinker obtained by burning the cement clinker at 1,300° C. so that in the burned cement clinker, the content of fluorine is within a range from 300 to 750 mg/kg, the content of sulfur (expressed in terms of $SO_3$) is within a range from 1.5 to 3.0% by mass, the content of any one or more chlorine equivalent(s) selected from the group consisting of chlorine and bromine is within a range from 150 to 350 mg/kg and the content of any one or more metallic element(s) selected from the group consisting of elements in groups 3 through 12 of the periodic table is within a range from 0.2 to 0.8% by mass may have 1.0% by mass or less the amount of free-lime, which indicates that the cement clinker has been substantially burned. Moreover, cement made using the burned cement clinker may have 60 N/mm² or more of strength at its material age of 28 days and also operate in a matter similar to the conventional ordinary portland cement.

BEST MODE FOR CARRYING OUT THE INVENTION

The present invention will be specifically described below by way of embodiments.

The present invention is directed to a burned cement clinker, including at least one selected from the group consisting of fluorine, sulfur, chlorine and bromine and at least one metallic element selected from the group consisting of elements in groups 3 through 12 of the periodic table, and a method for producing the same.

[Burned Cement Clinker]

In order to lower the burning temperature of the cement clinker, it has been known for a long time to add the mineralizer containing fluorine, sulfur and chlorine into the cement clinker. In the embodiments according to the present invention, however, at least one selected from the group consisting of fluorine, sulfur, chlorine and bromine and at least one metallic element selected from the group consisting of elements in groups 3 through 12 of the periodic table (hereinafter referred to as "metallic elements") are available for the mineralizer component(s). The component containing at least one selected from the group consisting of a fluorine component, a sulfur component, chlorine and bromine and the other component containing the metallic elements may be individually added into the cement raw material to burn, or the mineralizer into which all of the components are incorporated may be added to the cement raw material to burn.

For the cement raw material to which the mineralizer is added, the conventional raw material for the ordinary portland cement may be used. The components in the cement clinker are not intended to be particularly limited as long as it can comply with, for example, Japanese Industrial Standards (JIS).

As the mineralizer component(s), fluorine may be used in the form of calcium fluoride or the like; sulfur may be used the form of anhydrite or the like; chlorine may be used in the form of calcium chloride or the like; and bromine may be used in the form of calcium bromide or the like.

At least one metallic element selected from the group consisting of elements in groups 3 through 12 of the periodic table, which may be used as the mineralizer component(s), may preferably include metallic elements from group IV of the periodic table. Among the metallic elements from group IV, particularly preferred are zinc, vanadium, cobalt, nickel and copper because they are effective at lowering the burning temperature of the cement clinker. More preferably, at least one metallic element selected from the group consisting of zinc, vanadium, cobalt, nickel and copper may be incorporated into the mineralizer as the component(s).

Among the metallic elements, since group V to group XII elements of the periodic table may be unavailable and costly, the metallic elements from group IV may be preferably used. The metallic elements may be especially used in the form of oxides thereof.

Further, fluorine polluted sludge discharged from a semiconductor plant may be used as a fluorine source, and a powder of waste gypsum plaster board may be used as a sulfur source. As a source of the metallic elements, slag occurred during the refining process of copper, zinc and the like; vinyl chloride resin-coated copper wires which are separated from electronic or automotive shredder residues or the like; and vanadium recovered from smoke emission generated in a thermal power plant; and the like are also usable. Further, waste materials including a bromine-based flame retardant and the like may be also available.

Preferably, in the burned cement clinker, the amount of fluorine is within a range from 300 to 750 mg/kg, the amount of sulfur (expressed in terms of $SO_3$) is within a range from 1.5 to 3.0% by mass, the amount of at least one chlorine equivalent(s) selected from the group consisting of chlorine and bromine is within a range from 150 to 350 mg/kg and the amount of at least one metallic element selected from the group consisting of elements in groups 3 through 12 of the periodic table is within a range from 0.2 to 0.8% by mass.

Less than 300 mg/kg of the amount of fluorine may not result in the sufficiently reduced burning temperature, or more than 750 mg/kg of the amount of fluorine may lead to deterioration in the quality of the resulting cement. Accordingly, the amount of fluorine is more preferably 400 mg/kg or more and 750 mg/kg or less, even more preferably 500 mg/kg or more and 700 mg/kg or less. Less than 1.5% by mass of the amount of sulfur (expressed in terms of $SO_3$) may not result in the sufficiently reduced burning temperature, or more than 3.0% by mass of the amount of sulfur may lead to strength decreasing of the resulting cement, and therefore, it would be undesirable. Accordingly, the amount of sulfur (expressed in terms of $SO_3$) is more preferably 2.0% by mass or more and 3.0% by mass or less, and even more preferably 2.2% by mass or more and 2.8% by mass or less.

The amount of the chlorine equivalent(s) corresponds to the total of the amount of chlorine and the amount of bromine expressed in terms of chlorine. Specifically, it corresponds to the sum of the amount of chlorine [Cl] and the content of bromine expressed in terms of chlorine ([atomic ratio of Cl/Br, 0.444]×[weight of Br]), that is ([Cl]+0.444×[Br]). Less than 150 mg/kg of the amount of the chlorine equivalent(s) may not result in the sufficiently reduced burning temperature, or more than 350 mg/kg of the amount of the chlorine equivalent(s) may fail to meet the standards of the cement. Accordingly, the amount of the chlorine equivalent(s) is more preferably 175 mg/kg or more and 330 mg/kg or less, and even more preferably 200 mg/kg or more and 300 mg/kg or less.

The amount of metallic elements corresponds to the sum of the amount of zinc [Zn] and the amount of the respective metallic elements expressed in terms of zinc. Specifically, it corresponds to the sum as follows:

The amount of V expressed in terms of zinc=[atomic ratio of Zn/V]×[amount of V]=1.284×[V];

The amount of Co expressed in terms of zinc=[atomic ratio of Zn/Co]×[amount of Co]=1.110×[Co];

The amount of Ni expressed in terms of zinc=[atomic ratio of Zn/Ni]×[content of Ni]=1.114×[Ni]; and The amount of Cu expressed in terms of zinc=[atomic ratio of Zn/Cu]×[content of Cu]=1.029×[Cu], and thus, the amount of metallic elements is calculated from the following formula:[Zn]+1.284 [V]+1.110[Co]+1.114[Ni]+1.029[Cu].

Less than 0.2% by mass of the content of metallic elements may not result in the sufficiently reduced burning temperature, or more than 0.8% by mass of the amount of metallic elements may lead to strength decreasing of the resulting cement, and therefore, it would be undesirable. Accordingly, the amount of metallic elements is more preferably 0.3% by mass or more and 0.7% by mass or less, and even more preferably 0.4% by mass or more and 0.6% by mass or less.

[Method for Production]

Fluoride such as calcium fluoride, a sulfuric compound such as type II anhydrite, a chloride such as calcium chloride and the like are added into the cement raw materials along with oxides of the metallic elements so that in the resulting burned cement clinker, the amount of fluorine is within a range from 300 to 750 mg/kg, the amount of sulfur (as $SO_3$) is within a range from 1.5 to 3.0% by mass, the amount of chlorine equivalent(s) is within a range from 150 to 350 mg/kg and the amount of metallic elements is within a range from 0.2 to 0.8% by mass, followed by burning. Alternately, the mineralizer into which all of the above components are incorporated may be first prepared to add to the cement raw material, followed by burning. Also, the mineralizer into which all of the above components are incorporated may be provided by blowing it from Kiln burner's end to the cement raw material.

The cement raw materials may include a mixture containing limestone, clay, silica and iron material, as well as wastes containing constituents utilizable for the cement raw materials, and the like.

Addition of the mineralizer components into the cement raw materials may result in the reduced burning temperature, and thereby, make it possible to burn the cement clinker at the temperature of 1,300° C. or lower. In particular, the temperature required for burning of the cement clinker to make the burned cement clinker may be 1,200° C. or higher and 1,300° C. or lower.

EXAMPLES

Examples of the present embodiment and Comparative Examples will be illustrated below.

[Preparation of Raw Materials, Test Method]

To provide an industrial raw material for the ordinary portland cement and a cement clinker having given modulus values, reagents calcium carbonate, silicon oxide, aluminum oxide and ferric oxide were used. In addition, calcium fluoride, type II anhydrite, calcium chloride and oxides of the metallic elements were used as the mineralizer components to be contained in the cement clinker.

The materials were blended so that the cement clinker composition is as shown in Table 1 and the modulus values and the mineral composition of the cement clinker are as reported in Table 2 to burn the blend in an electric furnace at 1,300° C. for 90 minutes. Progress of burning was monitored by measuring the amount of free-lime (free calcium oxide/f-CaO) in the cement clinker. The amount of free-lime was determined by a standard test method The Cement Association of Japan Standard (JCAS) I-01: 1997 "Method for Determination of Free Calcium Oxide".

The burned cement clinker to which gypsum was added so as to be 2% by mass of the amount of $SO_3$ was ground in a test mill to reduce it to a powder mostly having 3,300 $cm^2$/g of specific surface, as measured by Blaine's air permeability method, resulting in a cement. Using the cement, setting time and strength at the material age of 28 days were determined according to JIS R 5201.

TABLE 1

[Chemical Composition of Cement Clinker]

| $SiO_2$ | $Al_2O_3$ | $Fe_2O_3$ | CaO | MgO | $SO_3$ | $Na_2O$ | $K_2O$ | TiO | $P_2O_5$ | MnO | Total |
|---|---|---|---|---|---|---|---|---|---|---|---|
| 22.07 | 5.73 | 2.97 | 66.25 | 1.22 | 0.43 | 0.29 | 0.31 | 0.18 | 0.23 | 0.03 | 99.71 |

Note:
Represented in % by mass

TABLE 2

[Modulus values of Cement Clinker and Mineral Composition as measured by Bouge calculation]

| HM | SM | IM | AI | LSD | $C_3S$ | $C_2S$ | $C_3A$ | $C_4AF$ |
|---|---|---|---|---|---|---|---|---|
| 2.15 | 2.54 | 1.93 | 3.85 | 0.921 | 57.9 | 19.6 | 10.2 | 9 |

Note:
HM: hydraulic modulus, SM: silica modulus, IM: iron modulus, AI: activity index, LSD: lime saturation degree, $C_3S$: tricalcium silicate, $C_2S$: dicalcium silicate, $C_3A$: tricalcium aluminate, $C_4AF$: calcium aluminoferrite (each mineral composition is represented in % by mass)

Test Example 1

A cement clinker was prepared using as a mineralizer fluorine in an amount of the cement clinker shown in Table 3 and modifying chemical abundance of all the rest components as shown in Tables 1 and 2, and burned to make a cement. Preparation of the cement was conducted according to the method described above for adding gypsum into the cement clinker and then grinding them. Table 3 shows the amount of free-lime in each cement clinker and setting time of each cement. Table 3 shows that addition of fluorine leads to a decrease in the amount of free-lime, and as a result, a mineralizing action to lower the burning temperature may be observed. Table 3 also shows that whereas the setting time takes too long at 950 mg/kg of the amount of fluorine, the amount of free-lime is approximately 3% by mass at 260 mg/kg of the content of fluorine, and then, it results in inadequate burning. Therefore, the appropriate amount of fluorine is considered to be within a range from 300 to 750 mg/kg.

TABLE 3

| No. | Amount of F (fluorine) (mg/kg) | f-CaO (% by mass) | Setting time | Remarks |
|---|---|---|---|---|
| A1 | 150 | 3.95 | 2:21 | Inadequate burning |
| A2 | 260 | 2.96 | 2:15 | Inadequate burning |
| A3 | 400 | 1.84 | 2:24 | — |
| A4 | 750 | 1.36 | 2:40 | — |
| A5 | 950 | 0.95 | 3:06 | Too long setting time |

Test Example 2

A cement clinker was prepared by using as a mineralizer fluorine and sulfur to adjust the content of fluorine and the amount of $SO_3$ in the cement clinker to 750 mg/kg and the $SO_3$ value shown in Table 4, respectively, and modifying chemical abundance of all the rest components as shown in Tables 1 and 2, and burned as a whole to make a cement. Preparation of the cement was conducted according to the method described above for adding gypsum into the cement clinker and then grinding them. The amount of free-lime in each cement clinker, as well as setting time and the strength of each cement are shown in Table 4. As shown in Table 4, the addition of $SO_3$ leads to a decrease in the amount of free-lime, and as a result, a mineralizing action to lower the burning temperature may be observed. Table 4 also shows that whereas 4% by mass of the content of $SO_3$ leads to the strength decreasing of the cement (at its material age of 28 days), 0.5% by mass of the amount of $SO_3$, resulting in more than 1% by mass of the amount of free-lime. Therefore, the preferable amount of $SO_3$ is considered to be within a range from 1.5% by mass to 3% by mass in order to provide the cement with sufficient strength and to lower the burning temperature of the cement clinker.

TABLE 4

| No. | Amount of $SO_3$ (% by mass) | f-CaO (% by mass) | Setting Time | Strength (N/mm²) | Remarks |
|---|---|---|---|---|---|
| B1 | 0.5 | 0.36 | 2:40 | 6.25 | — |
| B2 | 2 | 0.95 | 2:35 | 61 | — |
| B3 | 3 | 0.84 | 2:24 | 60.8 | — |
| B4 | 4 | 0.87 | 2:30 | 58.2 | Strength decreasing |

Test Example 3

A cement clinker was prepared by using as a mineralizer fluorine, sulfur and chlorine to adjust the content of fluorine, the content of $SO_3$ and the amount of the chlorine equivalent in the cement clinker to 750 mg/kg, 2% by mass and the value shown in Table 5, respectively, and modifying chemical abundance of all the rest components as shown in Tables 1 and 2, and burned as a whole to make a cement. Preparation of the cement was conducted according to the method described above for adding gypsum into the cement clinker and then grinding them. The amount of free-lime in each cement clinker, as well as setting time and the strength of each cement are shown in Table 5. As shown in Table 5, the addition of chlorine leads to a decrease in the amount of free-lime, and thereby a mineralizing action may be observed, and that whereas at 80 mg/kg of the amount of chlorine equivalent, the setting time of the cement is 2 hours 35 minutes and is slightly longer, the cement fails to meet the standards of the cement at 520 mg/kg of the amount of the chlorine equivalent. Therefore, the preferable amount of the chlorine equivalent is considered to be within a range from 150 mg/kg to 350 mg/kg.

TABLE 5

| No. | Chlorine equivalents (mg/kg) | f-CaO (% by mass) | Setting Time | Strength (N/mm²) | Remarks |
|---|---|---|---|---|---|
| C1 | 80 | 0.95 | 2:35 | 61 | — |
| C2 | 175 | 0.74 | 2:28 | 62.5 | — |

TABLE 5-continued

| No. | Chlorine equivalents (mg/kg) | f-CaO (% by mass) | Setting Time | Strength (N/mm$^2$) | Remarks |
|---|---|---|---|---|---|
| C3 | 330 | 0.71 | 2:25 | 62.3 | — |
| C4 | 520 | 0.72 | 2:15 | 60.8 | Nonconformity |

Note:
The cement C4 fails to meet the standards of the cement.

Example 1

A cement clinker was prepared by using as a mineralizer fluorine, sulfur, chlorine and a metallic elements to adjust the amount of fluorine, the content of SO$_3$ and the amount of the chlorine equivalent in the cement clinker to 750 mg/kg, 2% by mass and 330 mg/kg, respectively, adjusting the amount of the metallic elements to the value shown in Table 6 and modifying chemical abundance of all the rest components as shown in Tables 1 and 2, and burned as a whole to make a cement. Preparation of the cement was conducted according to the method described above for adding gypsum into the cement clinker and then grinding them. The amount of free-lime in each cement clinker, as well as setting time and the strength of each cement are shown in Table 6. The amount of metallic elements corresponds to the sum of the amount of zinc, and the amounts of vanadium, cobalt, nickel and copper expressed in terms of zinc (Zn+1.284 V+1.110 Co+1.114 Ni+1.029 Cu). As shown in Table 6, the addition of metallic elements leads to a considerable decrease in the amount of free-lime and also provides substantial burning even when burned at 1,300° C., and thereby, a mineralizing action may be observed. On the other hand, whereas 0.1% by mass of the amount of metallic elements leads to slightly too much of the amount of free-lime, 1.0% by mass of the amount of metallic elements leads to the strength decreasing of the cement. Therefore, the appropriate amount of metallic elements is considered to be within a range from 0.2 to 0.8% by mass.

TABLE 6

| No. | Amout of metallic elements (% by mass) | f-CaO (% by mass) | Setting Time | Strength (N/mm$^2$) | Evaluation |
|---|---|---|---|---|---|
| D1 | 0.1 | 0.71 | 2:25 | 62.3 | B |
| D2 | 0.2 | 0.55 | 2:26 | 61 | A |
| D3 | 0.8 | 0.5 | 2:28 | 61.3 | A |
| D4 | 1 | 0.47 | 2:43 | 56 | strength decreasing |

Note:
Evaluation A indicates that the cement meets the criteria, and B indicates that the cement has slightly too much of the amount of free-lime.

The invention claimed is:

1. A burned cement clinker, comprising:
   fluorine;
   sulfur;
   at least one selected from the group consisting of chlorine and bromine;
   metallic elements consist of vanadium, cobalt, nickel, copper and zinc; and
   tricalcium silicate, dicalcium silicate, tricalcium aluminate, and calcium aluminoferrite, wherein,
   an amount of the metallic elements are within a range from 0.4 to 0.8% by mass, and
   the amount of the metallic elements corresponds to a sum of the amount of zinc and the amounts of the respective metallic elements expressed in terms of zinc.

2. The burned cement clinker according to claim 1, wherein in the burned cement clinker, the amount of fluorine is within a range from 300 to 750 mg/kg, the amount of sulfur (expressed in terms of SO$_3$) is within a range from 1.5 to 3.0% by mass, the amount of at least one chlorine equivalent selected from the group consisting of chlorine and bromine is within a range from 150 to 350 mg/kg.

3. The burned cement clinker according to claim 2, wherein the amount of the chlorine equivalent(s) corresponds to a total of the amount of chlorine and the amount of bromine expressed in terms of chlorine.

* * * * *